Patented Feb. 2, 1937

2,069,710

UNITED STATES PATENT OFFICE 2,069,710

PREPARED SULPHUR

Edmund C. Missbach, Berkeley, Calif., assignor to San Francisco Sulphur Company, a corporation of California No Drawing. Application February 26, 1934, Serial No. 713,013

5 Claims. (Cl. 167—20)

This invention relates to a powdered or finely divided sulphur material to be used principally in dusting orchards, growing crops and the like for pest control and treatment of chlorosis.

Sulphur is reduced by sublimation or grinding to the form of a very fine powder, dust, or flour. In this form it is passed through machines which distribute or blow it in the form of a dust over the field wherein is situated the crop to be treated. The subdivision of sulphur is attended with a major difficulty in that the comminuted sulphur tends to pack and revert to lump form which is difficult to break up and distribute as a powder or dust. This tendency has been overcome by including magnesium carbonate (see Pough 1,629,528), by incorporating bentonite in the fused sulphur and then milling, by including an oil and an emulsifier and by the use of acetates. These materials serve to reduce the sulphur content in any given mass and thereby reduce the parasiticidal value. In accordance with this invention I am enabled to produce a dusting sulphur of satisfactory free flow characteristics and particularly a dusting sulphur which has an insecticidal value over and above that of the sulphur alone.

It is my discovery that if a small amount of metallic zinc in the form of zinc dust or a zinc compound, one which is not hygroscopic or deliquescent, usually one that possesses a very low water solubility, be incorporated with the powdered sulphur, the sulphur remains free flowing and does not cohere to form lumps. To incorporate the zinc compound, the sulphur in finely divided form, if not freshly made, is screened to remove lumps. The sulphur and the zinc compound are then fed into a mechanical mixer in which they are agitated for about half an hour, or the solid sulphur material may be ground together with the zinc compound. The mixture is then sacked or otherwise packaged, as desired.

As suitable non-hygroscopic, and substantially insoluble materials I mention metallic zinc in the form of zinc dust and compounds thereof including the oxide, hydroxide, carbonate, sulphide, sulphite, phosphate, pyrophosplate, stearate, cyanide, arsenate, oxalate, borate, and silicate of zinc, as well as organic zinc compounds as zinc cinnamate, zinc helionthate, various sulphonates of zinc as zinc phenol sulphonate and other organic zinc compounds.

The zinc carbonate, hydroxide, oxide, and sulphide are the most practical and, of these, basic zinc carbonate and the oxide made by the wet process are preferred since they are light and fluffy, as well as inexpensive, comparatively. These compounds, generally all salts of weak acids, either singly or in mixtures, are effective when added in amounts of half of one per cent, by weight, although when the product is to be subjected to severe conditions, as much as three per cent or more may be included.

The term "light and fluffy" is used as expressive of the physical characteristics of materials most advantageously used in accordance with this invention. For example, a light and fluffy zinc oxide successfully used in accordance with this invention will weigh about 30 pounds per cubic foot while a heavy zinc oxide of a pure and refined grade weighs 91 pounds per cubic foot. Similarly, under the Chancel test, the light and fluffy oxide had a value of about 98° Chancel while the pure and refined but heavy oxide had a value of 24° Chancel. The term "light and fluffy" is used as expressive of the material of low density and high Chancel number as set forth.

The amount of zinc compound added is not objectionable as it is not a mere diluent. When the sulphur-zinc mixture is exposed to moisture, sunlight, and air, oxidation of sulphur occurs and zinc-sulphur compounds effective as parasiticides are produced, such as zinc sulphate, which is particularly effective on cryptogramic parasites. The oxidation of sulphur takes place slowly and zinc-sulphur products form slowly, so that at any one time the quantity of zinc salt soluble in water present is insufficient to burn the vegetation or foliage. This reaction occurs only under such conditions as when the mixture is exposed to the sunlight, moisture, and the atmosphere.

I claim:

1. As a composition of matter a mixture consisting of a dry finely divided sulphur and a substantially water insoluble non-hygroscopic, light and fluffy compound of zinc rendering said sulphur free flowing.

2. As a composition of matter a mixture consisting of a dry finely divided sulphur and about 3% of a substantially water insoluble non-hygroscopic, light and fluffy compound of zinc rendering said sulphur free flowing.

3. A free flowing dust consisting of dry finely divided sulphur and about 3% of light fluffy zinc carbonate to render said sulphur free flowing.

4. A free flowing dust consisting of dry finely divided sulphur and about 3% of light fluffy zinc sulphide to render said sulphur free flowing.

5. A fungicidal and insecticidal dust consisting essentially of free flowing finely divided sulphur containing about 3% of light fluffy zinc oxide.

EDMUND C. MISSBACH.